Patented June 30, 1936

2,045,841

UNITED STATES PATENT OFFICE 2,045,841

PRODUCTION OF ACETALDEHYDE

Henry Dreyfus, London, England

No Drawing. Application January 7, 1932, Serial No. 585,382. In Great Britain February 26, 1931

6 Claims. (Cl. 260—139)

This invention relates to the production of acetaldehyde by the catalytic inter-action of steam and acetylene.

According to the present invention, acetaldehyde is produced by the inter-action of steam and acetylene in the presence of a catalyst comprising one or more alkaline earth metal borates, silicates or phosphates or salts of other oxy-acids of phosphorus.

As examples of the catalysts which may be employed in performing the invention may be mentioned:—meta borates, normal meta and pyro-phosphates and silicates of calcium, barium and magnesium and mixtures of two or more of such bodies. The catalyst may comprise, or may also comprise, naturally occurring forms of such compounds, for example wollastonite $CaSiO_3$, augite $CaMg(SiO_3)_2$, osteolite $Ca_3(PO_4)_2$, and the calcium boro-silicates $CaO$, $B_2O_3$, $2SiO_2$, danburite and datolite.

The catalysts may with advantage also comprise oxides or other compounds, particularly silicates, borates or phosphates or salts of other oxy-acids of phosphorus, of heavy metals, such for instance as iron, copper, nickel, zinc, molybdenum or vanadium, and such heavy metal oxides or compounds may be employed, for example, in simple admixture with the above mentioned alkaline earth compounds, or, for example, as supports for the said alkaline earth compounds.

Further, the catalysts, whether comprising heavy metal oxides or other compounds or not, may if desired, be supported, mixed with or spread upon porous carriers such, for instance, as pumice, carborundum, kieselguhr or the like.

In performing the invention, the mixture of steam and acetylene may be subjected to the reaction at temperatures between about 150° and 500° C., and especially between about 250° and 400° C., and at any desired pressure, such for example as normal atmospheric pressure or reduced pressure or "vacuum" or increased pressures such, for example, as 2 to 3 atmospheres.

The mixture of steam and acetylene employed for the purposes of the invention preferably contains an excess of steam, for example 3 to 5 or more volumes of steam to each volume of acetylene and the mixture may also contain other gases such, for example, as air, nitrogen, hydrogen or methane.

The reaction may be performed in any convenient manner, thus, for example, the mixture comprising the steam and acetylene may be passed in a rapid stream through a tube or other form of apparatus (which tube or other form of apparatus may be made, for instance chromium-nickel steel, earthenware, silica or the like) containing the catalyst and heated to the desired temperature, the gases issuing from the reaction zone being cooled and/or scrubbed or otherwise treated to separate the acetaldehyde formed in the reaction.

The following example shows a convenient form of execution of the invention, but it is to be understood that this example is given merely by way of illustration and that the invention is in no way limited thereto.

Example

A mixture of steam and acetylene in the proportion of about 4 volumes of steam to each volume of acetylene is passed in contact with a catalyst consisting of a mixture of magnesium silicate and iron silicate and containing about 5 per cent. of iron silicate at a temperature of between about 300–350° C. These silicates may, if desired, be replaced by similar phosphates.

The acetaldehyde produced may be separated from the vapors issuing from the reaction zone is any convenient manner. Thus for instance the said vapors may be condensed and the acetaldehyde distilled or fractionated from the distillate; or, for instance, the vapors may first be cooled to about 15–20° C. to condense most of the water whilst the acetaldehyde, or the major part thereof, passes on and may be condensed by strong cooling or absorbed in a solvent, e. g. glacial acetic acid, this latter procedure being particularly useful when the acetaldehyde is to be subsequently oxidized to acetic acid.

What I claim and desire to secure by Letters Patent is:—

1. Process for the production of acetaldehyde comprising reacting steam upon acetylene in the presence of at least one alkaline earth metal in the form of a salt of an oxygen acid of phosphorus.

2. Process for the production of acetaldehyde comprising reacting steam upon acetylene in the presence of at least one alkaline earth metal in the form of a salt of a phosphoric acid.

3. Process for the production of acetaldehyde comprising reacting steam upon acetylene in the presence of at least one alkaline earth metal in the form of a salt of an oxygen acid of phosphorus at a temperature of from 150 to 500° C.

4. Process for the production of acetaldehyde comprising reacting steam upon acetylene in the presence of at least one alkaline earth metal in the form of a salt of a phosphoric acid at a temperature of from 150 to 500° C.

5. Process for the production of acetaldehyde comprising reacting steam upon acetylene in the presence of at least one alkaline earth metal in the form of a salt of an oxygen acid of phosphorus at a temperature of from 250 to 400° C.

6. Process for the production of acetaldehyde comprising reacting steam upon acetylene in the presence of at least one alkaline earth metal in the form of a salt of a phosphoric acid at a temperature of from 250 to 400° C.

HENRY DREYFUS.